United States Patent
Singhal et al.

(10) Patent No.: US 11,474,677 B2
(45) Date of Patent: Oct. 18, 2022

(54) ASSISTING USERS IN VISUALIZING DIMENSIONS OF A PRODUCT

(71) Applicant: ADOBE INC., San Jose, CA (US)

(72) Inventors: Gourav Singhal, Delhi (IN); Sourabh Gupta, Uttar Pradesh (IN); Mrinal Kumar Sharma, Jharkhand (IN)

(73) Assignee: ADOBE INC., San Jose, CA (US)

( * ) Notice: Subject to any disclaimer, the term of this patent is extended or adjusted under 35 U.S.C. 154(b) by 66 days.

(21) Appl. No.: 15/930,559

(22) Filed: May 13, 2020

(65) Prior Publication Data

US 2021/0357107 A1   Nov. 18, 2021

(51) Int. Cl.
| | |
|---|---|
| G06F 3/04842 | (2022.01) |
| G06Q 30/06 | (2012.01) |
| G06V 10/22 | (2022.01) |
| G06V 10/75 | (2022.01) |

(52) U.S. Cl.
CPC ..... *G06F 3/04842* (2013.01); *G06Q 30/0623* (2013.01); *G06Q 30/0643* (2013.01); *G06V 10/235* (2022.01); *G06V 10/751* (2022.01)

(58) Field of Classification Search
USPC .......................................................... 715/771
See application file for complete search history.

(56) References Cited

U.S. PATENT DOCUMENTS

| | | | | |
|---|---|---|---|---|
| 8,667,408 B2* | 3/2014 | Peterson | ................. | G09F 3/207 |
| | | | | 715/765 |
| 2011/0032555 A1* | 2/2011 | Mizutani | .............. | G06F 3/1208 |
| | | | | 358/1.9 |
| 2011/0252163 A1* | 10/2011 | Villar | ..................... | G06F 30/30 |
| | | | | 710/16 |
| 2013/0106910 A1* | 5/2013 | Sacco | ................ | G06Q 30/0261 |
| | | | | 345/633 |
| 2013/0268854 A1* | 10/2013 | Altin | ................... | G06F 3/04845 |
| | | | | 715/708 |

(Continued)

OTHER PUBLICATIONS

Solid Professor, Collision Detection—Solidworks Tutorial, YouTube, available at https://www.youtube.com/watch?v=vKzIBDNXchk (posted Mar. 9, 2007).*

(Continued)

*Primary Examiner* — Sherief Badawi
*Assistant Examiner* — Conrad R Pack
(74) *Attorney, Agent, or Firm* — F. Chau & Associates, LLC

(57) ABSTRACT

A computer readable medium for sizing a product includes instructions, that when executed by at least one processor, cause a computing device to: retrieve from a webpage information on a product including product dimensions; present on a display of a client device a graphical button that upon access by a user activates a camera for capturing an image of an object positioned at a focal distance from the camera, the object having a surface; prompt the user to enter boundary information of an imaginary housing to be placed on the surface; generate the imaginary housing dimensions in two dimensions (2D) based on the boundary information and the focal distance; and determine whether the product fits within the imaginary housing by comparing the product dimensions against the imaginary housing dimensions.

15 Claims, 9 Drawing Sheets

(56) References Cited

U.S. PATENT DOCUMENTS

| | | | | |
|---|---|---|---|---|
| 2014/0282060 A1* | 9/2014 | Bhardwaj | ............ | G06F 3/04842 |
| | | | | 715/744 |
| 2015/0346854 A1* | 12/2015 | Lee | ..................... | G06F 3/04883 |
| | | | | 345/173 |
| 2017/0068643 A1* | 3/2017 | Shamir | ................. | G06F 40/169 |
| 2017/0124636 A1* | 5/2017 | Qi | ...................... | G06K 9/00671 |
| 2017/0323488 A1* | 11/2017 | Mott | ..................... | G06T 19/006 |
| 2018/0047192 A1* | 2/2018 | Kristal | ............... | G06Q 30/0643 |
| 2018/0276841 A1* | 9/2018 | Krishnaswamy | .. | G06K 9/00671 |
| 2019/0325653 A1* | 10/2019 | Yip | ..................... | G06F 3/04815 |

OTHER PUBLICATIONS

"Amazon adds an AR shopping feature to its iOS app"; https://techcrunch.com/2017/11/01/amazon-adds-an-ar-shopping-feature-to-its-ios-app/—publication date Nov. 2017.

"14 best Augmented Reality furniture apps"; https://thinkmobiles.com/blog/best-ar-furniture-apps (Aug. 2018).

"Shopify AR Makes Shopping in Augmented Reality a Reality for Small Businesses"; https://www.shopify.com/blog/shopify-ar (Sep. 2018).

"IKEA's AR furniture app now lets you preview an entire room"; https://www.engadget.com/2019-09-23-ikea-place-app-room-sets.html (Sep. 2019).

* cited by examiner

ASSISTING USERS IN VISUALIZING DIMENSIONS OF A PRODUCT

1. TECHNICAL FIELD

This disclosure relates to techniques for assisting a user in visualizing dimensions of a product, and more particularly, to techniques for visualizing dimensions of a product from a two-dimensional (2D) image of the product.

2. BACKGROUND

Electronic commerce (e-commerce) is the activity of electronically buying or selling products on online services over the Internet. Some e-commerce platforms provide a virtual outfit experience that enables a user to visualize themselves wearing a product using a three-dimensional (3D) rendering of the product. However, small retailers typically cannot afford to pay for the creation of a 3D model of their product since it is very expensive. Thus, these e-commerce platforms may have a relatively low buying conversion rate when used by small retailers.

Current e-commerce platforms enable sellers to list the dimensions of their products (e.g., Length*Breadth*Height). However, most of these product dimensions are only provided in a textual form, and it can be quite difficult for a user to adequately visualize the true size of the product. For example, the human mind is typically very slow at processing real physical dimensions from a 2D image into 3D space. Many online product reviews show disappointments in receiving products that are much smaller than expected.

A user may want to purchase a product for placement in very limited space. However, it can be difficult for the user to determine whether the product will fit properly within the space using the provided textual product dimensions.

SUMMARY

Embodiments of the disclosure provides techniques for enabling users to visualize dimensions of products having various sizes in real time without requiring expensive 3D image rendering. These embodiments provide an innovative solution that can be integrated into any e-commerce platform to leverage shopping experience techniques and to boost product conversions, especially for small retailers.

According to an exemplary embodiment of the disclosure, a computer readable medium for sizing a product includes instructions, that when executed by at least one processor, cause a computing device to: retrieve from a webpage information on a product including product dimensions; present on a display of a client device a graphical icon that upon access by a user activates a camera for capturing an image of an object positioned at a focal distance from the camera, the object having a surface; prompt the user to enter boundary information of an imaginary housing to be placed on the surface; generate imaginary housing dimensions of the imaginary housing in two dimensions (2D) based on the boundary information and the focal distance; and determine whether the product fits within the imaginary housing by comparing the product dimensions against the imaginary housing dimensions.

According to an exemplary embodiment of the disclosure, a system for enabling a user to visualize a product size includes a server and a client device. The server is configured to store a plurality Web pages for each of a plurality of products, where each Web page provides product dimensions on a corresponding one of the products and a graphical button. The client device includes a Web browser configured to interface with the server over a computer network to retrieve one of the Web pages for a given product and an application configured to launch an interface that activates a camera of the client device, requests boundary information from the user for placing the given product, and presents a two dimensional (2D) image of the given product for selection by the user. The application generates a boundary rectangle from the boundary information and determines whether the given product will fit within the boundary rectangle based on the corresponding product dimensions and the selected 2D image. The application enables the user to perform a physical marking of opposite corner points of the boundary rectangle on a display of the client device to generate the boundary information.

According to an exemplary embodiment of the disclosure, a computer-implemented method for visualizing a product within a desired space includes: a server formatting a Web page of a product to include a graphical button; the server sending the Web page across a computer network to a client device upon receiving a request from the client device for the Web page; and an application of the client device launching an interface that activates a camera, requests boundary information from a user, and presents a plurality of two-dimensional (2D) images of the product for selection of one by the user, in response to selection of the graphical button. The application presents a boundary rectangle derived from the boundary information and one of the 2D images within the boundary rectangle upon the user entering the boundary information and selecting the one 2D image.

BRIEF DESCRIPTION OF THE DRAWINGS

The detailed description describes embodiments with additional specificity and detail through use of the accompanying drawings, briefly described below.

DETAILED DESCRIPTION OF THE EXEMPLARY EMBODIMENTS

E-commerce is a huge platform, which is growing at an unprecedented rate all over the world, especially among mobile devices. People from every age shop from different e-stores like Amazon®, Flipkart®, and eBay®. Online shopping provides better sales conversion as compared to physical shopping stores.

Some e-commerce sites provide a very immersive experience. For example, Lenskart®, which is a popular eyewear brand in India, allows users to select eyewear frames and visualize the selected eyewear on a user's face in real time. Even platforms such as Magento® by Adobe® offer a virtual outfit experience. However, these technologies purely work on 3D model renderings of products to enable a user to visualize the appearance of a product in virtual space. This means that a seller needs to create a 3D model, which is typically very expensive and often out of reach for smaller retailers. Instead of creating these 3D models, smaller retailers merely provide the dimensions of their products textually on their product pages (e.g., length*width*height). However, since it is difficult for human beings to visualize whether the product will fit within a desired space mentally using these textual dimensions, many potential sales are lost.

Thus, embodiments of the disclosure provide product visualization using 2D images of products. Further, embodiments of the disclosure may use an image segmentation method such as GrabCut to extract a product image from a 2D image of the product and a background surrounding the product, measure dimensions of the extracted 2D product image and perform scaling on the extracted 2D product image using the measured dimensions and textual dimensions of the product. Moreover, since embodiments of the disclosure rely on 2D images, they do not require expensive 3D image rendering of products. Additionally, embodiments of the disclosure are able to determine whether the product will fit within a desired space by determining the boundaries of the space using a Simultaneous Location and Mapping (SLAM) technique.

The following terms are used throughout the present disclosure:

The term "e-commerce" may refer to commercial transactions conducted electronically on the internet.

The term "e-commerce platform" may refer to a software application that allows online business to mange their website, marketing, sales, and operations.

The term "GrabCut" may refer to an image segmentation technique based on graph cuts. The technique may estimate a color distribution of a target object and that of the background using a Gaussian mixture model.

The term "Simultaneous Localization and Mapping" or "SLAM" may refer to a technique that uses sensor data (e.g., data from acoustic sensors, laser rangefinders, and visual sensors) to determine a map of the environment, positions of objects within the environment, and sizes of the objects.

Figure 1:
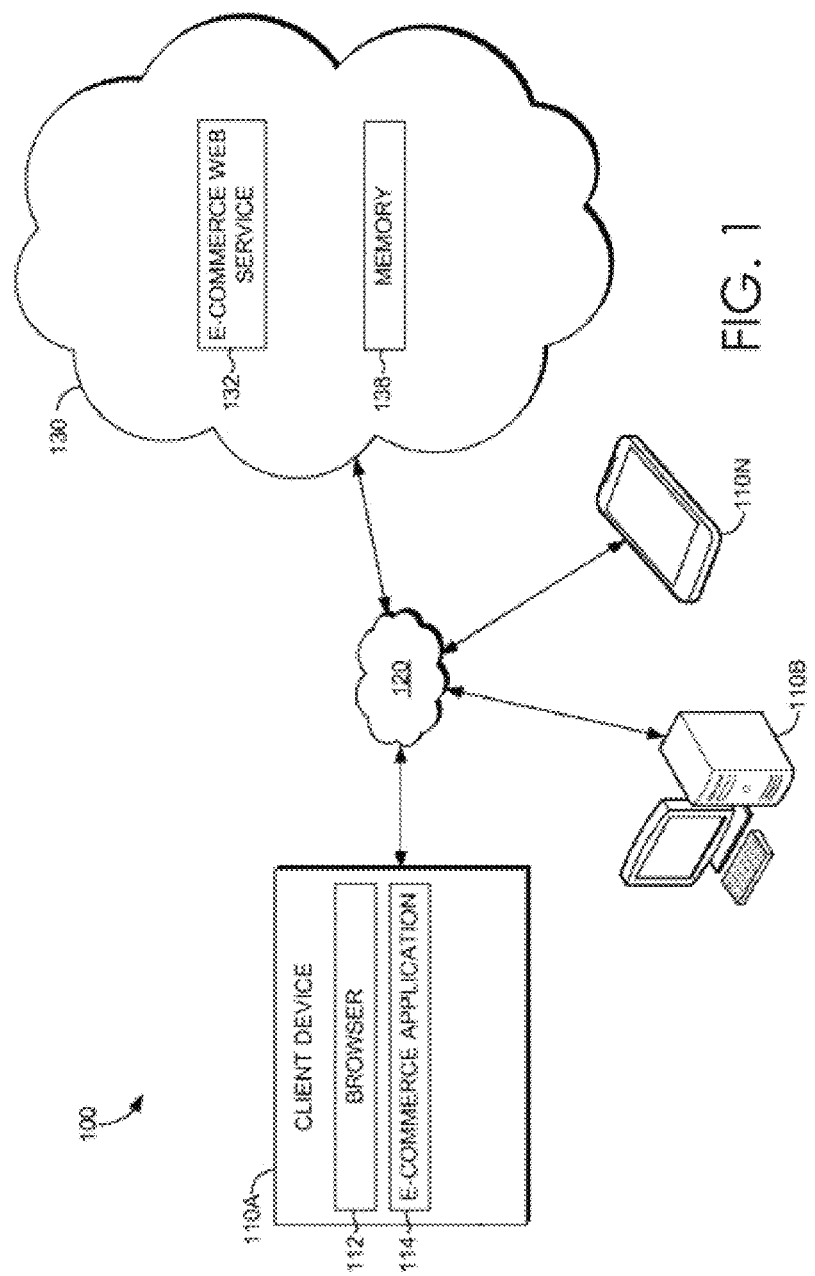
FIG. 1 is an illustration of an environment in an example implementation that is operable to employ techniques described herein.

Turning now to FIG. 1, a diagram is provided illustrating an exemplary system in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 can be a client-server system or a server-only system that can be utilized to let users visualize dimensions of products in real time. Among other components not shown, the system 100 can include any number of client devices, such as client devices 110*a* and 110*b* through 110*n*, network 120, and one or more remote server devices 130. It should be understood that any number of servers and client devices may be employed within system 100 within the scope of the present disclosure. Each may comprise a single device or multiple devices cooperating in a distributed environment. Additionally, other components not shown may also be included within the distributed environment.

It should further be understood that system 100 shown in FIG. 1 is an example of one suitable computing system architecture. Each of the servers and client devices shown in FIG. 1 may be implemented via a computing device, such as computing device 600, later described with reference to FIG. 6, for example. The components may communicate with each other via network 120.

Network 120 may be wired, wireless, or both. Network 120 may include multiple networks, or a network of networks, but is shown in simple form so as not to obscure aspects of the present disclosure. By way of example, network 120 can include one or more wide area networks (WANs), one or more local area networks (LANs), one or more public networks, such as the Internet, and/or one or more private networks. Where network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 120 is not described in significant detail.

In various implementations, client devices 110*a* and 110*b* through 110*n* are computing devices that are capable of accessing the Internet, such as the World Wide Web. Client devices might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

Client devices 110*a* and 110*b* through 110*n* can include one or more processors, and one or more computer-readable media. The computer-readable media may include computer-readable instructions executable by the one or more processors. The instructions may correspond to one or more applications, such as browser 112 and/or e-commerce application 114, shown on client device 110*a*.

Browser 112, such as a web browser, can be an HTTP-compatible application (e.g. an Application that supports an HTTP protocol). A specific example of browser 112 is a Google® Chrome® web browser. F-commerce application 114 may be independently installed on the client device as a standalone application, or can be accessed through a web-based application hosted by server 130 or other server (s) (not shown) and accessible to client devices by the browser 112. The e-commerce application 114 is launched when a user selects a specific call to action (CTA) button (e.g., labelled "explore dimensions") on a product page (e.g., a Web page) presented on the browser 112. The CTA button is a graphical button. For example, the Web page may be one or more text files written in a Hypertext Markup Language (HTML). The text files may also include Java code, JavaScript code, or CSS code. The e-commerce application 114 launches a camera of the client device and displays a graphical window on a display of the client device that presents what is seen by the camera and a message asking the user to define two corner points to represent a rectangular space where the user desires to place an object (e.g., the product illustrated on the product page). In an exemplary embodiment, prior to marking the two corner points, the e-commerce application 114 requests that the user select a position of a surface of an object (e.g., a tabletop, a floor, etc.) the product is to be placed. If the product is to be hung on a wall, the e-commerce application 114 may additionally request that the user select a position of the floor and indicate a position of the wall relative to the floor. The commerce application 114 may use the position of the surface, position of the floor, and position of the floor relative to the wall, and the two corner points to determine the actual dimensions of the boundary rectangle or the rectangular space. While the present application discusses use of a rectangular space or a boundary rectangle, embodiments of the inventive concept are not limited thereto. For example, in alternate embodiment, the system may request that the user enter a center of a circle and a radius of the circle to represent a circular space where the user desires to place the product.

The two points may be an upper left corner and a lower right corner of a boundary rectangle or a lower left corner and an upper right corner of the boundary rectangle. The boundary rectangle may be referred to as an imaginary housing since the product will be housed or placed within the boundary rectangle. The e-commerce application 114 automatically creates a rectangular frame by joining the two points as defined by the user. The e-commerce application 114 enables the user to then choose any product views (e.g., uploaded by seller), which the user wants to visualize its physical dimensions. This visualization is to see whether the product would fit into the space or not. The visualization may be based on product dimensions (e.g., height and width) of the product received from the e-commerce web service 132. For example, the e-commerce web service 132 could be implemented by a Magento® platform. The product page that includes the CTA button may be stored in memory 136 on the server 130. The e-commerce web service 132 may have previously augmented an existing product page received from a seller to additionally include the CTA button, and stored the augmented product page in the memory 136, for retrieval over the network 120 by the e-commerce application 114. The CTA button may have a callback function that is executed when the CTA button is later pressed by a user. The callback function may include code of a program that launches an interface that activates a camera of the client device 110a, presents what is seen by the camera in the interface, requests user provided boundary information, and presents one or more selectable 2D images of a product of the product page. The entry of the boundary information (e.g., marking corner points) and selection of one of the 2D images may cause presentation of the selected 2D image within a boundary box derived from the boundary information.

In some instances, the e-commerce application 114 is accessible over the web (e.g., an e-commerce website or a cloud-based web application) through the browser 112. Accessing the e-commerce application 114 over the web can be accomplished on the client device 110a by visiting a Uniform Resource Identifier (URI or URL) to receive code (e.g., HTML) for rendering, the code being dynamically generated by the server 130 and communicated to the client device 110a over the network 120.

The e-commerce application 114 is configured to communicate with one or more servers, such as server 130, via network 120, which may comprise the Internet. For example, the e-commerce application 114 may communicate with the e-commerce web service 132 to receive the product dimensions of the product and different illustrated views of the product. As illustrated, server 130 can include one or more server computing device(s) comprising an e-commerce web service 132 and a memory 138. The server 130 can include a plurality of computing devices configured in a networked environment, or can include a single computing device hosting each of the e-commerce web service 132 and memory 138. Each server computing device can include one or more processors, and one or more computer-readable media. The computer-readable media may include computer-readable instructions executable by the one or more processors. The instructions may correspond to one or more applications, such as e-commerce web service 132, shown on server device 130. The server 130 can be configured to store, among other things, a plurality of products, corresponding product pages, and one or more corresponding visual representation(s) for each product in a memory 138.

The e-commerce web service 132 can comprise a web server, such as Apache®, IIS®, Nginx®, or GWS®, among many others, and can be configured to communicate over the network 120 to provide an electronic shopping experience to consumers on a client device via browser 112 or e-commerce application 114. While the standard network protocol for communication is HTTP, it is contemplated that any network protocol can be used to distribute information between the e-commerce web service 132 and the e-commerce application 114 of client device 110a. In more detail, if the e-commerce application 114 is communicated to the client device 110a over the World Wide Web and accessed via browser 112, the e-commerce web service 132 can be configured to provide HTML webpages, or the like, to consumers for browsing an online retail store and viewing product pages in more detail. If the e-commerce application 114 is a standalone application installed on the client device 110a, and is configured to communicate with the e-commerce web service 132 over network 120 (e.g., the Internet), the e-commerce web service 132 can be configured to provide framework data (e.g., XML documents) and content data (e.g., visual representations and product information) for rendering by the e-commerce application 114 so that consumers can also browse and view product pages.

Figure 2:
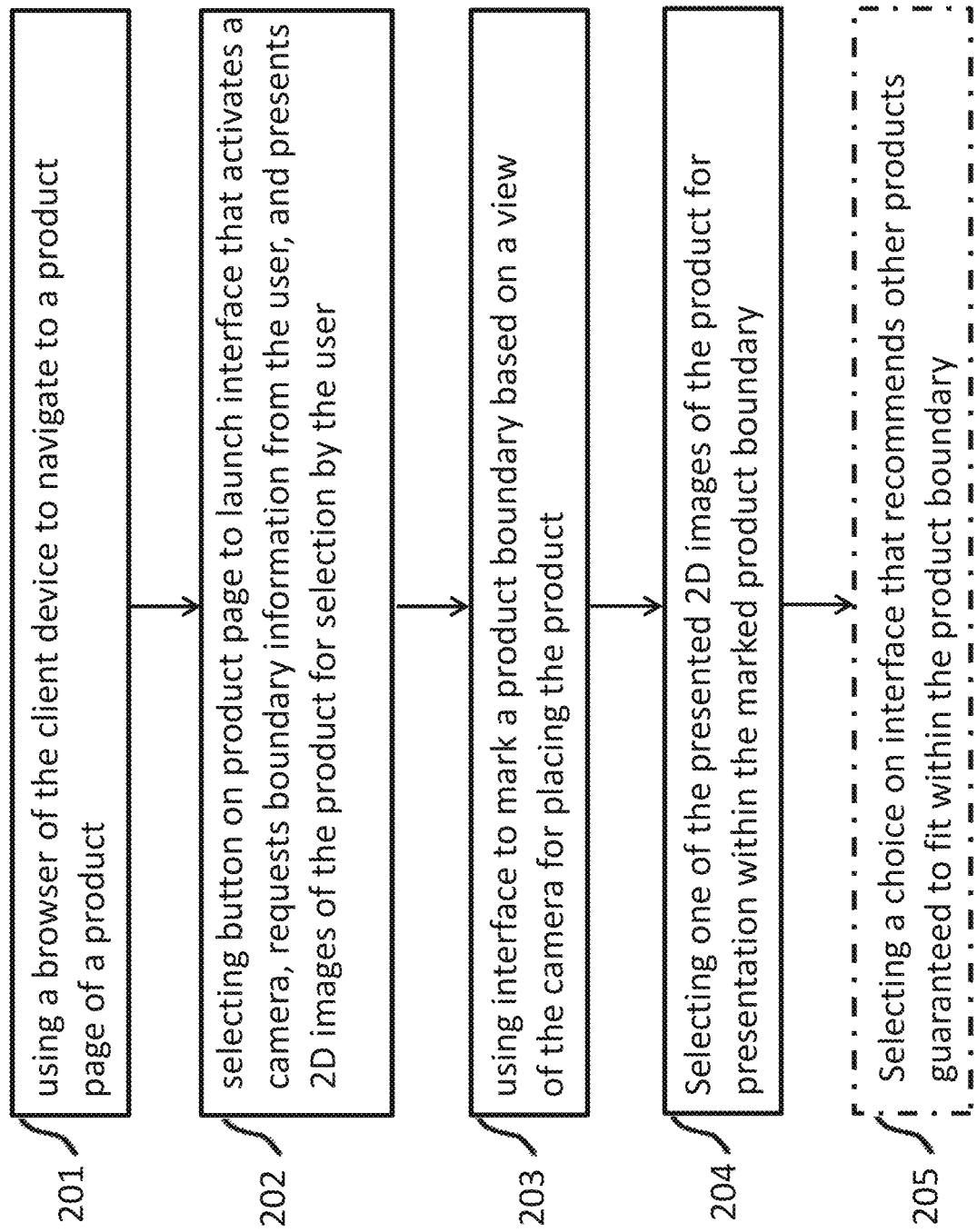
FIG. 2 illustrates a method of enabling a user to visualize dimensions of a product according to an exemplary embodiment of the disclosure.
Figure 3A:
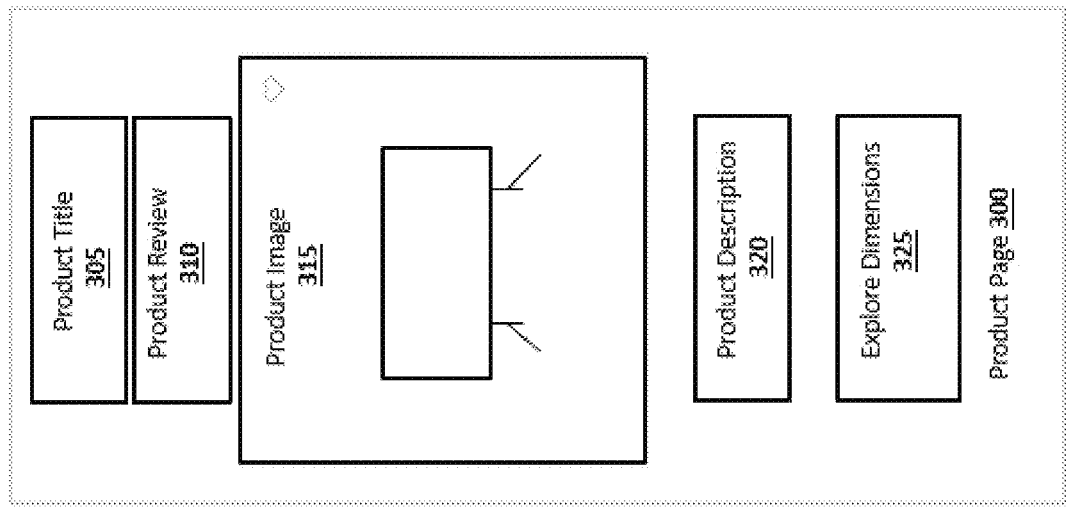
FIG. 3A illustrates an exemplary product page for a product that may be used to enable a user to visualize the product according to an exemplary embodiment of the disclosure.

FIG. 2 illustrates a method of visualizing a product according to an exemplary embodiment of the disclosure. Referring to FIG. 2, the method includes using a browser of the client device to navigate to a product page of a product (step 201). For example, the user could use the browser 112 to visit a popular e-commerce platform and select a certain product for sale to display a corresponding product page. FIG. 3A shows an example of the product page 300 for a television. As shown in FIG. 3A, the product page 300 includes a product title 305, a product review 310, a product image 315, a product description 320, and a Call to Action (CTA) button 325. While the CTA button 325 is labelled as "Explore Dimensions", the button 325 may have various other labels. Further, some of the information, buttons or fields presented in FIG. 3A may be omitted.

Figure 3B:
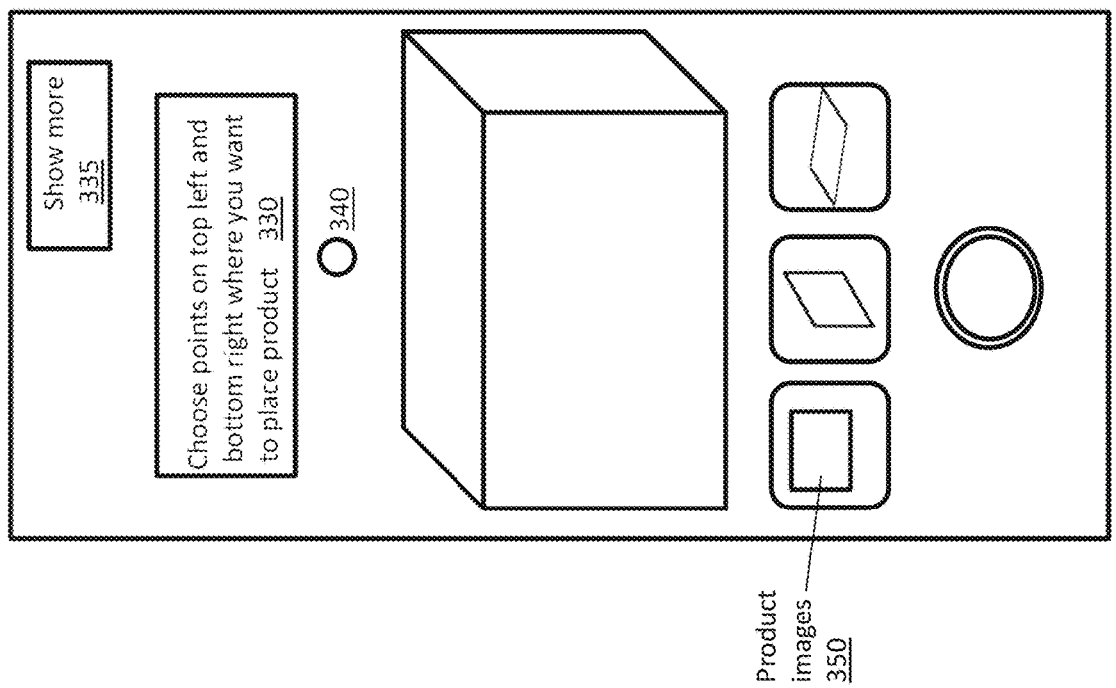
FIGS. 3B, 3C, and 3D illustrates an exemplary interface that may be used by a user to visualize the product.

The user in this example has very limited space on a shelf for the television, is unable to mentally visualize the textual dimensions (e.g., 729.98 mm*428 mm) of the television as listed by the seller, but wants to ensure that the television will fit on the shelf. Thus, the method of FIG. 2 further includes the user selecting a button 325 on the product page to launch an interface that activates a camera, requests boundary information from the user, and presents one or more 2D images (e.g., different views or poses) of the product for selection by the user (step 202). FIG. 3B shows an example of the interface. The interface provides instructions 330 for marking the product boundary and may further include a button 335 for requesting more information, a spot indicator 340 indicating a center of the product boundary, and one or more available 2D product images 350 of the product.

Figure 3C:
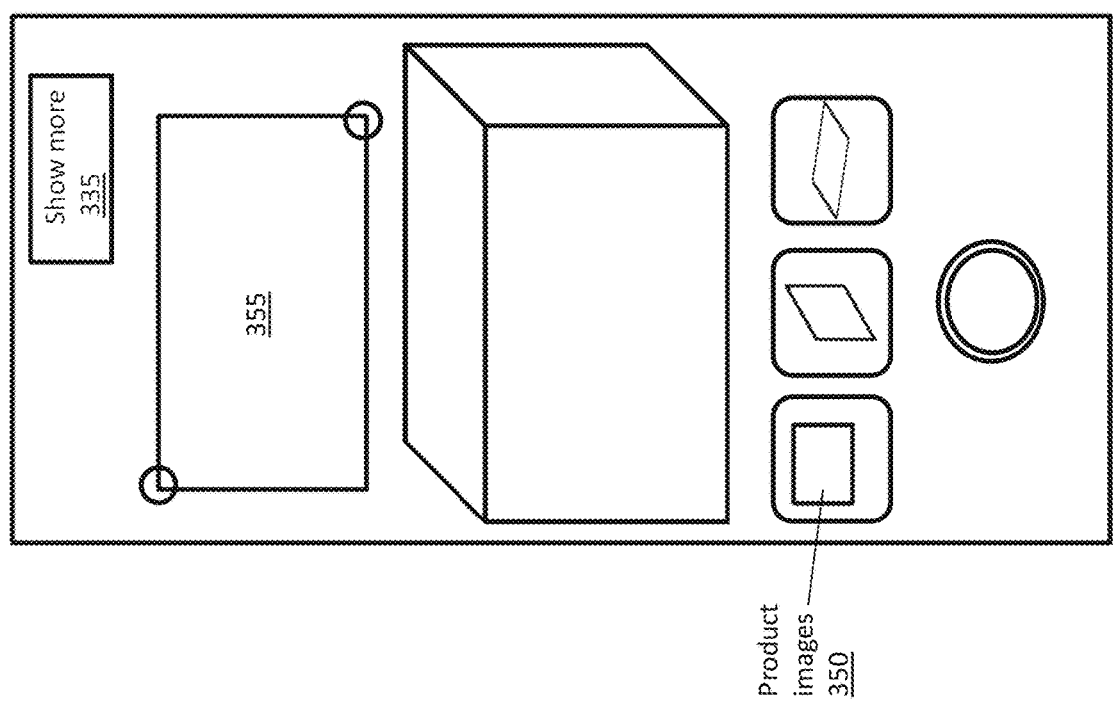

The method of FIG. 2 further includes the user using the interface to physically mark a product boundary based on a view of the camera for placing the product (step 203). FIG. 3C illustrates an example where the user marked an upper left point with a tap of a finger (or stylus) on the screen of the client device 110A, moved the client device 110A (i.e., moved the camera), and then marked a lower right point in a similar manner to create boundary box 355.

Figure 3D:
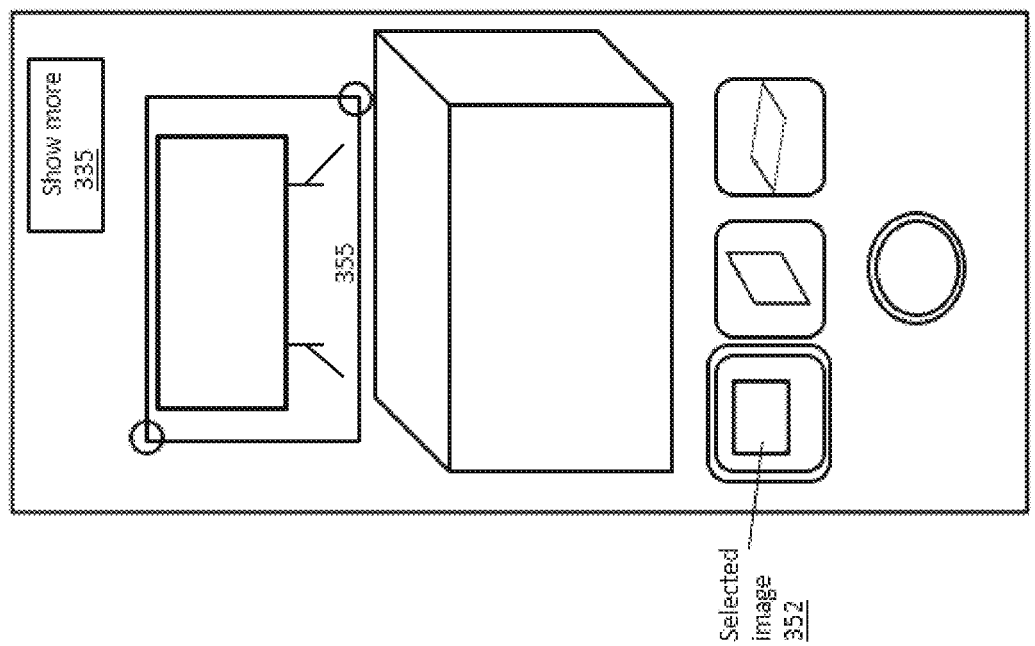

The method of FIG. 2 further includes the user selecting one of the presented 2D product images for presentation within the marked product boundary (step 204). FIG. 3D shows an example of the selected image 352 being selected from the product images 350 to cause its presentation within the boundary box 355. The boundary box 355 may be displayed with a certain color (e.g., green) to indicate that the product fits properly within the boundary box 355. The boundary box 355 may be displayed with another color (e.g., red) to indicate that the product does not fit properly within the boundary 355. Further, when the selected product image 352 does not fit, the selected product image 352 may overlap the boundary box 355. The user can select any product view from the product images 350 that he wishes to measure its dimensions and the system will place this product view in the formed dimensions of the boundary box 355. This lets the user visualize the object dimensions based on the context that he has chosen by drawing the rectangle of the boundary box 355.

The method of FIG. 2 may further optionally include the user choosing a choice on the interface that recommends other products guaranteed to fit within the product boundary box (step 205). For example, the "show more" button 335 illustrated in FIG. 3D could be selected to take the user to a different workflow that recommends to the user only those products that are guaranteed to fit within the boundary box 355.

Figure 4:
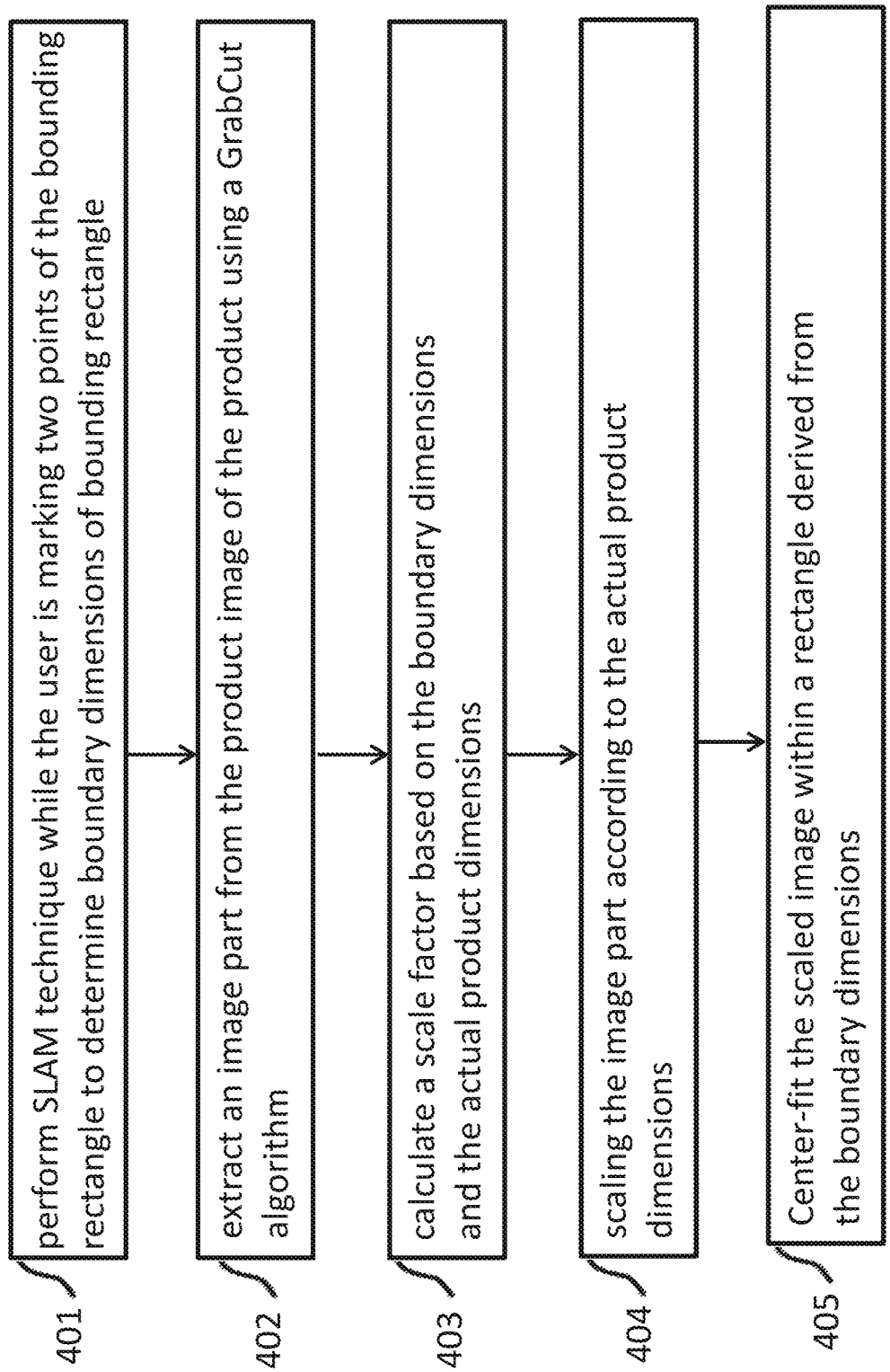
FIG. 4 illustrates a method of visualizing a product according to an exemplary embodiment of the disclosure.

FIG. 4 illustrates a method of determining whether a selected product image will fit within the user created boundary box according to an exemplary embodiment of the disclosure. The method of FIG. 4 includes performing a Simultaneous Location and Mapping (SLAM) technique while the user is marking two points of a bounding rectangle 355 to determine boundary dimensions of the boundary rectangle (step 401). The SLAM technique processes data sensed from a camera, motion sensors, a position of the device, and screen dimensions of the drawn boundary rectangle to determine the actual dimensions of the boundary rectangle. The SLAM technique may be performed using an augmented reality (AR) platform such as ARKit® in iOS® or ARCORE® in Android®.

In an exemplary embodiment, the dimensions of the boundary rectangle are extracted while the user is marking the two points with the client device 110A based on the distance and angle of the client device 110a from a focused object (e.g., spot 340). The Simultaneous Location and Mapping (SLAM) technique is a use case of computer vision field and photogrammetry. The captured frames of the camera of the client device 110A processed by models, and computer vision identifies and tracks some relevant points in the image of the boundary box 355. Those tracked points are referred to as anchors. The actual width and height of the boundary box 355 are then determined based on the anchors, hardware information and lens information (e.g., focal length) of the camera. In an exemplary embodiment of the disclosure, a graphical processor unit (GPU) computation is used to perform the computation to determine the dimensions of the boundary box 355 for faster results. The computation may be performed locally on the client device 110A using the e-commerce application 114 or remotely on the server 130 using the e-commerce web service 132. For example, when the computation is performed remotely, the anchors, hardware information and lens information is sent from the e-commerce application 114 across the network 120 to the E-commerce web service 132, the computation is performed by the e-commerce web service 132 using the received parameters to generate the dimensions (e.g., width and height) of the boundary box 355, and then the e-commerce web service 132 sends the generated dimensions across the network 120 to the client device 110A.

Figure 5C:
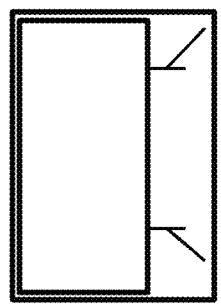
FIGS. 5A, 5B, and 5C illustrate use of GrabCut algorithm to extract a product from an image of a product according to an exemplary embodiment of the disclosure.
Figure 5B:
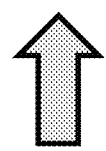
Figure 5B:
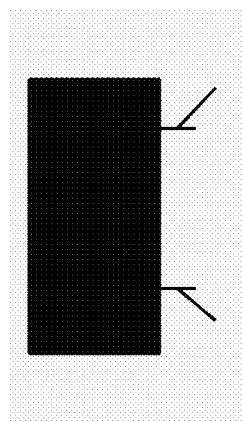
Figure 5A:
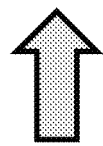
Figure 5A:
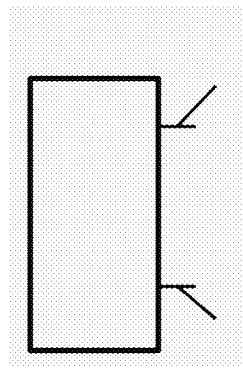

The method of FIG. 4 further includes extracting an image part from the selected product image (e.g., a 2D image) of the product using a GrabCut algorithm (step 402). In an exemplary embodiment of the inventive concept, the GrabCut algorithm starts with a user-specified bounding box around the product (i.e., the target object) in a 2D image including the product and a background surrounding the product. The algorithm may estimate the colors of the distributions of the target object and that of the background using a Gaussian mixture model to segment the 2D image into the target object and the background. FIG. 5A shows an example of the previously uploaded 2D image of the product that was selected by the user. FIG. 5B shows a result using a GrabCut algorithm to segment the 2D image into an image part including the product and a background surrounding the product, and FIG. 5C shows a bounding box around the image part that can be measured to determine the measurements of the image part, which can later be scaled according to the textual dimensions of the product. The GrabCut algorithm may be performed locally on the client device 110A by the e-commerce application 114 on a 2D product image received across the network 120 from the e-commerce web service 132. Alternately, the GrabCut algorithm may be performed remotely on the server 130 using the e-commerce web service 132.

The method of FIG. 4 further includes calculating a scale factor based on the boundary dimensions and the actual product dimensions (step 403). In an exemplary embodiment of the disclosure, the scaler factor SF is generated using Equation 1 as follows, $$SF=MAX(product\_height/box\_height, product\_width/box\_width) \quad [Equation\ 1]$$

where the product_height is the actual height of the product from the available product dimensions previously uploaded to the server 130 by the seller or stored within the Web page of the product, the box_height is the height of the product space determined using step 401, the product_width is the actual width of the product from the available product dimensions, and the box_width is the width of the product space determined using step 401. If the scale factor is less than 1, the product can fit in the dimensions of the product space. If the scale factor is greater than 1, then the product will not fit in the product space. For example, if the product_height is 2.5 cm and the box_height is 5 cm, and the product_width is 5 cm and the box_width is 10 cm, then the scale factor=0.5 and the product will fit in the product space.

The method of FIG. 4 further includes scaling the image part according to the actual product dimensions (step 404). For example, if the image part is 10×20 and the actual product dimensions are 40×60, the image part could be magnified by 3 to generate a scaled-up image.

The method of FIG. 4 further includes center-fitting the scaled-up image within a rectangle derived from the boundary dimensions (step 405), as shown in FIG. 3D. If the product fits within the boundary rectangle according to the scale factor, then the boundary rectangle can be drawn with a color (e.g., green) indicating the product will fit. If the product does not fit within the boundary rectangle according to the scale factor, then the boundary rectangle can be drawn with a color (e.g., red) indicating the product will not fit.

Figure 6:
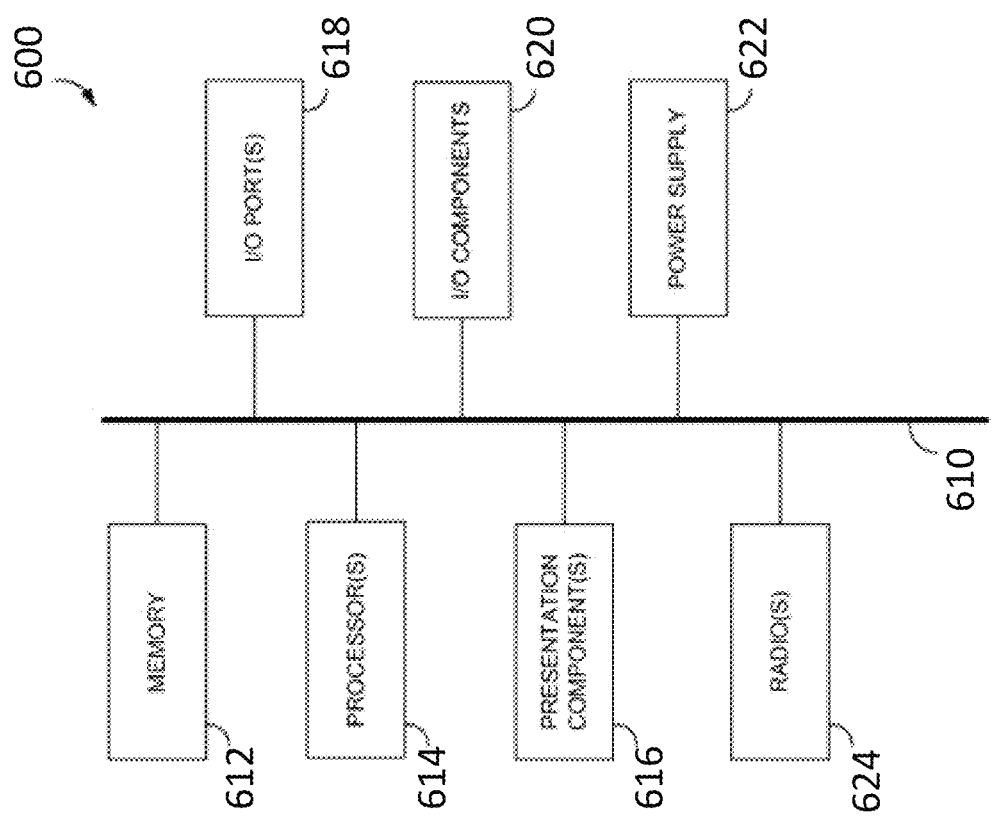
FIG. 6 is a block diagram of an exemplary computing environment suitable for use in implementations of the present disclosure.

Having described implementations of the present disclosure, an exemplary operating environment in which embodiments of the present invention may be implemented is described below to provide a general context for various aspects of the present disclosure. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). For example, one may consider a presentation component such as a display device to be an I/O component. The diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition.

As described above, implementations of the present disclosure can assist users (e.g., online shoppers) in visualizing whether a product will fit in a chosen environment. Embodiments of the disclosure can intelligently scale the product image to its actual size in the chosen environment. The product is properly fitted to the given space, which is what the user intended apart from determining its visual appeal. The visualized image is not a 3D model, but a 2D image. So, in this case, the user does not need to pinch or zoom or rotate the image to fit within the given space. Thus, embodiments of the disclosure allow users to quickly know if the product is underfitting or overfitting or properly fitting in the given environment.

As discussed above, a computer readable medium for sizing a product is provided that determines whether a product fits within an imaginary housing. The computer readable medium may further include an instruction to perform a GrabCut algorithm for scaling the imaginary housing dimensions to the product dimensions in 2D. The computer readable medium may further include an instruction to display a 2D image of the product superimposed onto the imaginary housing.

As discussed above, a system to enable a user to visualize a product size is provided that retrieves a Web page of the product and includes an application that generates a boundary rectangle and launches an interface. The Web page may include a graphical button and the application may launch the interface upon the user selecting the graphical button. The boundary rectangle may be generated from a user marked corner points and a focal length of a camera. The application may use a simultaneous location and mapping algorithm during marking of the corner points to determine boundary dimensions of the boundary rectangle. The boundary dimensions may include a boundary width and boundary height, the product dimensions may include a product width and product height, and the application may determine whether the given product will fit by dividing the product width by the boundary width to generate a first scale factor, dividing the product height by the boundary height to generate a second scale factor, and determining that the given product will fit when both scale factors are less than one. The application may extract an image part from the selected 2D image using a GrabCut algorithm, scale the image part according to the product dimensions, and center-fit the scaled image within the boundary rectangle. The application may draw the boundary rectangle in a first color upon determining the given product will fit within the boundary rectangle and draw the boundary rectangle in a second other color upon determining the given product will fit not within the boundary rectangle. The application may draw the boundary rectangle to overlap the scaled image upon determining the given product will fit not within the boundary rectangle. The interface may include a graphical button that inserts another product into the boundary rectangle that fits within the boundary rectangle, upon a user selecting the graphical button. The interface may present a 2D image of the product along with at least one other selectable 2D image of the product arranged into a different position. The activate of the camera may present what is captured by the camera in the interface.

As discussed above, a computer-implemented method for visualizing a product within a desired space is provided that sends a Web page of a product to a client device upon receiving a request from the client device for the Web page and launches an interface. The request may be received from a Web browser of the client device. The interface may present a view seen by a camera and enable a user to physically mark corner points of a boundary rectangle to define boundary information. The interface may use a simultaneous location and mapping (SLAM) technique to determine a boundary width and a boundary height of the boundary rectangle. The interface may determine whether the product will fit within the boundary rectangle by considering textual product dimensions for the product stored in the Web page, the boundary width, and the boundary height. The interface may determine whether the product will fit by: dividing the boundary width by a product width of the product dimensions to generate a first scale factor, dividing the boundary height by a product height of the product dimensions to generate a second scale factor, and determining that the given product will fit when both scale factors are less than one.

The present invention has been described in relation to particular embodiments, which are intended in all respects to be illustrative rather than restrictive. Alternative embodiments will become apparent to those of ordinary skill in the art to which the present invention pertains without departing from its scope. Numerous specific details are described to provide a thorough understanding of various embodiments of the present invention.

What is claimed is:

1. A non-transitory computer readable medium for sizing a product comprising instructions that, when executed by at least one processor, cause a computing device to:
   retrieve from a website information on a product including product dimensions comprising a product width and a product height in two dimensions;
   present on a first user interface of a client device a graphical button that upon access by a user activates a camera for capturing an image and causes display of the image captured by the camera;
   determine actual dimensions of a space represented by the image captured by the camera;
   present a second user interface to prompt the user to perform a manual marking of a first corner point of a two-dimensional (2D) boundary rectangle followed immediately by a second corner point of the 2D boundary rectangle diagonally opposite the first corner point on a display screen of a client device to draw the 2D boundary rectangle on the display screen;
   determine boundary dimensions of the 2D boundary rectangle within the actual dimensions of the space, including a boundary width and a boundary height, using a focal distance of the client device to an object of the image within the 2D boundary rectangle and an angle of the client device with respect to the object, while the user is performing the manual marking;
   extract a product image part from a selected 2D image of the product retrieved from the website, scale the product image part according to the retrieved product dimensions and actual dimensions of the space, and display, on the display screen and based on the manual marking, the scaled product image part and the boundary rectangle within the image captured by the camera by center-fitting the scaled product image part within the boundary rectangle; and
   determine whether the product fits within the 2D boundary rectangle by comparing the retrieved product dimensions against the boundary dimensions,
   wherein the application draws the boundary rectangle in a first color and draws the boundary rectangle to not overlap the scaled product image part upon determining the product will fit within the boundary rectangle and draws the boundary rectangle in a second color different than the first color and draws the boundary rectangle to overlap the scaled product image part upon determining the product will not fit within the boundary rectangle.

2. A system to enable a user to visualize a product size, the system comprising:
   a server configured to store a plurality of Web pages; and
   a client device comprising a Web browser configured to interface with the server over a computer network to retrieve information from one of the Web pages on a product including product dimensions comprising a product width and a product height in two dimensions and an application configured to launch an interface that activates a camera of the client device for capturing an image and causing display of the image captured by the camera, determines actual dimensions of a space represented by the image captured by the camera and requests the user to begin performing a manual marking of a first corner point of a two-dimensional (2D) boundary rectangle followed immediately by a second corner point of the 2D boundary rectangle diagonally opposite the first corner point on a display screen of the client device for placing the product, wherein the application determines boundary dimensions of the 2D boundary rectangle within the actual dimensions of the space, including a boundary height and a boundary width using a focal distance of the client device to an object of the image within the 2D boundary rectangle and an angle of the client device with respect to the object while the user is performing the manual marking, wherein the application extracts a product image part from a selected 2D image of the product retrieved from the one web page, scales the product image part according to the retrieved product dimensions and actual dimensions of the space, and displays, on the display screen and based on the manual marking, the scaled product image part and the boundary rectangle within the image captured by the camera by center-fitting the scaled product image part within the boundary rectangle and determines whether the product will fit within the 2D boundary rectangle by comparing the retrieved product dimensions against the boundary dimensions, and wherein the application draws the boundary rectangle in a first color and draws the boundary rectangle to not overlap the scaled product image part upon determining the product will fit within the boundary rectangle and draws the boundary rectangle in a second color different than the first color and draws the boundary rectangle to overlap the scaled product image part upon determining the product will not fit within the boundary rectangle.

3. The system of claim 2, wherein the retrieved one Web page includes a graphical button and the application launches the interface upon the user selecting the graphical button.

4. The system of claim 2, wherein the application uses a simultaneous location and mapping algorithm during the marking to determine the boundary dimensions of the boundary rectangle.

5. The system of claim 2, wherein the application determines whether the product will fit by dividing the product width by the boundary width to generate a first scale factor, dividing the product height by the boundary height to generate a second scale factor, and determining that the given product will fit when both scale factors are less than one.

6. The system of claim 2, where the application extracts the product image part from a 2D image of the product using a GrabCut algorithm.

7. The system of claim 2, wherein the interface includes a graphical button that inserts another product into the boundary rectangle that fits within the boundary rectangle, upon a user selecting the graphical button.

8. The system of claim 6, wherein the interface presents the 2D image of the product along with at least one other selectable 2D image of the product arranged into a different position.

9. The system of claim 2, wherein the activate of the camera presents what is captured by the camera in the interface.

10. A computer-implemented method for visualizing a product within a desired space, the method comprising:
formatting, by a server, a Web page of a product to include a graphical button;
sending, by the server, the Web page across a computer network to a client device upon receiving a request from the client device for the Web page; and
launching, by an application of the client device, an interface that activates a camera to capture an image, causes display of the image captured by the camera and requests a user to begin performing a manual marking of a first corner point of a two-dimensional (2D) boundary rectangle followed immediately by a second corner point of the 2D boundary rectangle diagonally opposite the first corner point on a display screen of a client device for placing a product, in response to selection of the graphical button,
wherein the application determines actual dimensions of a space represented by the image captured by the camera, determines boundary dimensions of the 2D boundary rectangle within the actual dimensions of the space, including a boundary height and a boundary width using a focal distance of the client device to an object of the image within the 2D boundary rectangle and an angle of the client device with respect to the object, while the user is performing the manual marking,
wherein the application extracts a product image part from a selected 2D image of the product retrieved from the Web page, scales the product image part according to the retrieved product dimensions and actual dimensions of the space, and displays, on the display screen and based on the manual marking, the scaled product image part and the boundary rectangle within the image captured by the camera by center-fitting the scaled product image part within the boundary rectangle, and
wherein the application determines whether the product fits within the 2D boundary rectangle by comparing the retrieved product dimensions against the boundary dimensions, and
wherein the application draws the boundary rectangle in a first color and draws the boundary rectangle to not overlap the scaled product image part upon determining the product will fit within the boundary rectangle and draws the boundary rectangle in a second color different than the first color and draws the boundary rectangle to overlap the scaled product image part upon determining the product will not fit within the boundary rectangle.

11. The computer-implemented method of claim 10, wherein the request is received from a Web browser of the client device.

12. The computer-implemented method of claim 10, wherein the interface presents a view seen by the camera.

13. The computer-implemented method of claim 12, wherein the interface uses a simultaneous location and mapping (SLAM) technique to determine the boundary width and the boundary height of the boundary dimensions of the 2D boundary rectangle.

14. The computer-implemented method of claim 13, wherein the product dimensions are derived from textual product dimensions for the product stored in the Web page.

15. The computer-implemented method of claim 10, wherein the interface determines whether the product will fit by:
dividing the boundary width by the product width to generate a first scale factor;

dividing the boundary height by the product height to generate a second scale factor; and determining that the given product will fit when both scale factors are less than one.

\* \* \* \* \*